United States Patent Office 3,429,112
Patented Feb. 25, 1969

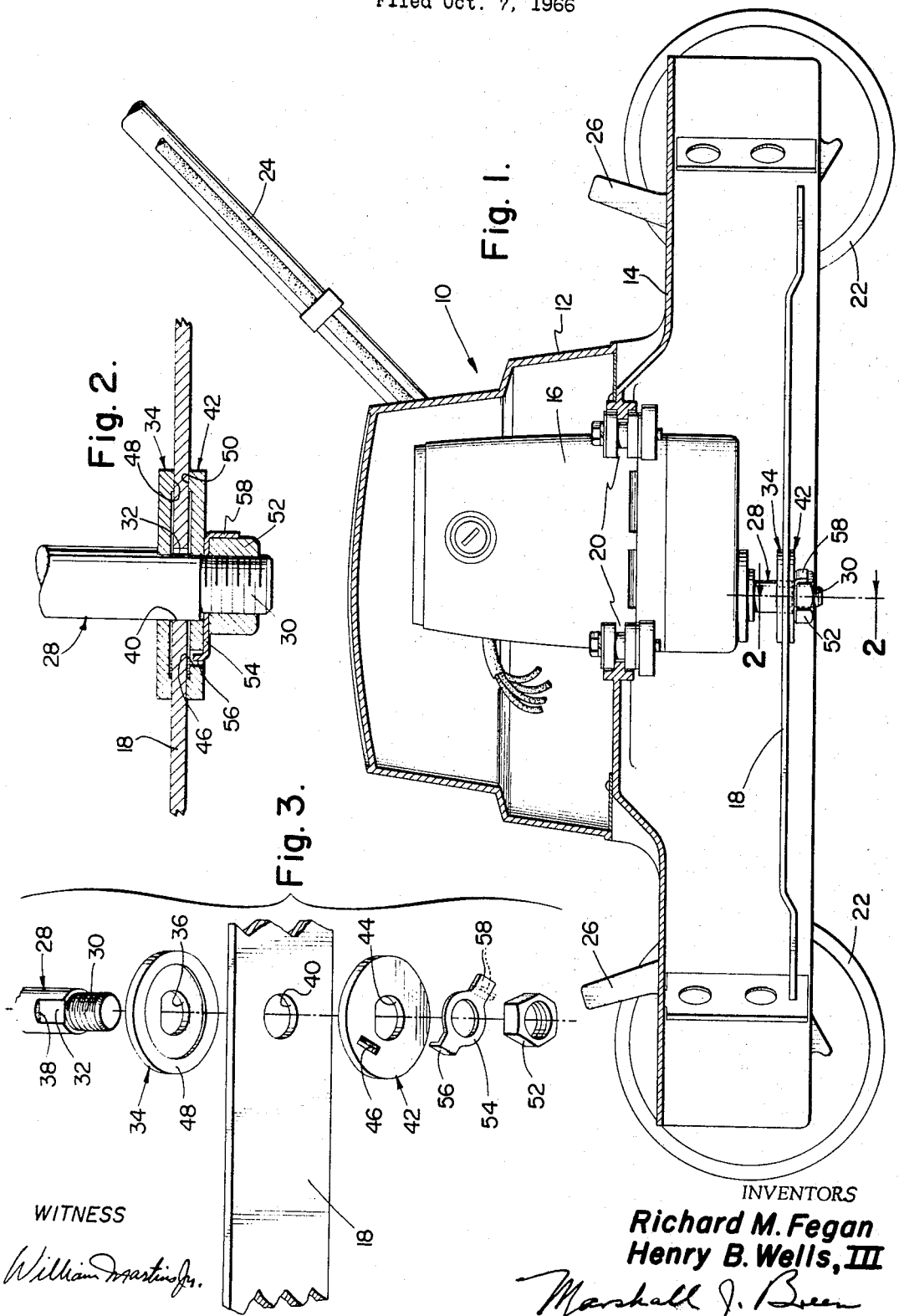

3,429,112
LAWNMOWER ROTARY BLADE
FRICTION CLUTCH
Richard M. Fegan, Taylors, and Henry B. Wells III,
Pickens, S.C., assignors to The Singer Company, New
York, N.Y., a corporation of New Jersey
Filed Oct. 7, 1966, Ser. No. 585,031
U.S. Cl. 56—295                   1 Claim
Int. Cl. P01d 55/18; F16d 7/02

The present invention relates to rotary lawnmowers, and in particular provides improved apparatus for coupling the blade of a rotary lawnmower to its drive shaft.

The closest known prior art is the rotary lawnmower apparatus disclosed in United States Patent No. 2,651,530, the purpose for which is identical to the purpose of the instant invention, viz. to provide a blade drive coupling which allows the blade to be driven ordinarily by the drive, but which coupling allows the blade to slip relative to the drive when the blade strikes hard objects, thereby preventing damage to the blade and assuring its long life.

The features of the invention are its low cost and simplicity of construction.

Accordingly, the object of the invention is to provide a rotary lawnmower the blade of which is free to slip relative to its drive shaft, and which blade is friction coupled between washers by means of a nut held in place on the shaft by one of the washers, the end of the drive shaft being provided with a non-circular cross-section, the blade being provided with a hole sufficiently large to permit its rotation relative to the shaft while supported on the shaft end, and the washers being provided with openings so shaped that the washers are not free to rotate while on the shaft end.

The invention will be described with reference to the figures wherein:

FIG. 1 is a side elevational view showing a rotary lawnmower embodying the invention, FIG. 2 is a cross-sectional view taken along line 2—2 of FIG. 1, and shows in detail the blade-drive coupling feature of the invention, and FIG. 3 is an exploded view useful in describing the assembly of the blade-drive coupling depicted in FIG. 2.

Referring to the figures, a rotary lawnmower 10 has a frame 12 and a blade shroud 14, the frame 12 so supporting a drive motor 16 that a blade 18 coupled to the motor may rotate generally horizontally within the shroud 14. The motor 16 is supported by means of clamp assemblies 20; and the mower as a unit is movable on wheels 22 by means of a handle 24, the lever elements 26 serving to adjust the cutting height of the mower and forming no part of the invention.

With particular reference now to FIGS. 2 and 3, the shaft 28 of the motor 16 has a threaded end 30 and a flattened surface 32. A concave washer 34 with a D-opening 36 is designed to slip snugly on the end of the shaft and rest against the shoulder 38 formed by virtue of the flattened surface 32. The blade 18, which as clearly shown in FIG. 3 has a circular mounting hole 40, fits on the shaft end between the washer 34 and a second concave washer 42, also having a D-opening 44. The washer 42 is identical to the washer 34 except for the provision in the washer 42 of an aperture 46. The two concave washers 34, 42 open toward the blade 18 sandwiched between them, with their peripheral parts 48, 50 frictionally contacting the blade 18. A nut 52 is designed to fit on the threaded end 30 of the shaft 28, and by properly setting the adjustment of the nut 52 the slippage point for the blade 18 may be set. A lock washer 54 locates between the nut 52 and the washer 42, the flange part 56 of the lock washer 54 residing in the aperture 46 of the washer 42; and the lock washer part 58 being bent (see FIGS. 1 and 2) to hook around the nut 52 to hold the nut in place once the proper adjustment of the blade slippage point has been set.

Since the D-openings 36, 44 of the washers 34, 42 prevent their rotation relative to the motor shaft 28, and since the washers 34, 42 are arranged to act like biased flat springs that grip the mower blade 18 at their respective peripheral parts 48, 50, the blade 18 turns with the shaft 28 when the shaft-washer combination turns, even though the shaft opening 40 would allow rotation of the blade 18 relative to the shaft 28. However, were the blade to strike a hard object such as a rock or the like, the frictional grip of the washers 34, 42 on the blade 18 would (depending on the setting of the nut 52) momentarily release to allow the blade to slip, whereby damage to the blade 18 would be prevented or, at the very least be reduced.

While the invention has been described in its preferred form it is to be understood that the words that have been used are words of description rather than of limitation and that changes within the purview of the appended claims may be made without departing from the true scope and spirit of the invention.

Having thus set forth the nature of this invention, what is claimed herein is:

1. A rotary lawnmower comprising a frame, wheels supporting said frame, a motor, the shaft of which is adapted to be generally vertically disposed, said motor being supported by said frame, and said motor shaft being provided with a threaded end and a flattened portion contiguous with said threaded end, said flattened portion forming a shoulder axially disposed away from said threaded end, a first washer having a non-circular opening therein, which opening is of substantially the same configuration as, but slightly larger than the cross-section of said shaft at said flattened shaft portion, a blade having a hole sufficiently large to permit rotation of said blade about the axis of said shaft at said flattened shaft portion, a second washer having a non-circular opening like the non-circular opening of said first washer, said blade and said washers being so adapted to mount on said shaft at said flattened portion that said first washer bears against said shoulder, said second washer locates adjacent to said threaded end, and said blade is sandwiched between said washers, a nut threaded on said shaft end and adapted to press said washers against said blade, and locking means coupling said nut to said second washer to prevent rotation of said nut.

References Cited

UNITED STATES PATENTS

| 2,651,530 | 9/1953  | Blydenburgh | 287—53  |
| 2,726,524 | 12/1955 | Gorin       | 64—30   |
| 2,862,376 | 12/1958 | Thelander   | 64—30   |
| 2,909,885 | 10/1959 | Smith       | 56—25.4 |
| 3,157,978 | 11/1964 | McMullen    | 56—295  |

RUSSELL R. KINSEY, Primary Examiner.

U.S. Cl. X.R.

64—30; 287—53